US012461000B2

(12) United States Patent
Lee et al.

(10) Patent No.: US 12,461,000 B2
(45) Date of Patent: Nov. 4, 2025

(54) ROLLING APPARATUS AND EVALUATION SYSTEM FOR EVALUATING DURABILITY OF FLEXIBLE MATERIAL

(71) Applicant: FlexiGO INC., Cheonan-si (KR)

(72) Inventors: Ki Yong Lee, Cheonan-si (KR); Hyeon Bong Moon, Cheonan-si (KR); Ho Moon You, Cheongju-si (KR)

(73) Assignee: FlexiGO INC., Cheonan-si (KR)

( * ) Notice: Subject to any disclaimer, the term of this patent is extended or adjusted under 35 U.S.C. 154(b) by 394 days.

(21) Appl. No.: 17/893,861

(22) Filed: Aug. 23, 2022

(65) Prior Publication Data
US 2022/0404251 A1 Dec. 22, 2022

Related U.S. Application Data

(63) Continuation of application No. PCT/KR2020/013943, filed on Oct. 13, 2020.

(51) Int. Cl.
*G01N 3/20* (2006.01)
*B21C 47/20* (2006.01)

(52) U.S. Cl.
CPC .............. *G01N 3/20* (2013.01); *B21C 47/20* (2013.01); *G01N 2203/0278* (2013.01)

(58) Field of Classification Search
None
See application file for complete search history.

(56) References Cited

U.S. PATENT DOCUMENTS

| 2,561,543 | A | * | 7/1951 | Teplitz | B21C 47/34 242/559.3 |
| 8,461,860 | B2 | * | 6/2013 | Kim | G01N 3/20 73/849 |
| 2012/0258257 | A1 | * | 10/2012 | Nguyen | C23C 16/45525 427/523 |
| 2015/0033870 | A1 | * | 2/2015 | Lee | G01N 3/20 73/849 |

FOREIGN PATENT DOCUMENTS

| EP | 3270137 A1 * | 1/2018 | ............... G01N 3/30 |
| KR | 10-0956555 B1 | 5/2010 |

(Continued)

OTHER PUBLICATIONS

Yuasa System Co., Ltd. "Small bench type durability test apparatus, system devices," catalog, Japan, 2017.

*Primary Examiner* — Christopher L Templeton
*Assistant Examiner* — P Derek Pressley
(74) *Attorney, Agent, or Firm* — United One Law Group LLC; Kongsik Kim; Jhongwoo Peck

(57) ABSTRACT

A rolling apparatus for evaluating durability of a flexible material includes a base unit, a rolling unit rotatably coupled to the base unit and around which the flexible material is wound, and a sliding unit which grips an end of the flexible material wound around the rolling unit and is spaced apart from the rolling unit to be slidably coupled to the base unit. The sliding unit is set to at least one of a preset speed and torque in the direction in which the flexible material is pulled, and at least one of the speed and torque of the rolling unit for an unrolling operation of the rolling unit and a rolling operation of the rolling unit is controlled such that the flexible material can maintain a flat state.

14 Claims, 9 Drawing Sheets

(56) References Cited

FOREIGN PATENT DOCUMENTS

| KR | 10-2013-0111786 A | | 10/2013 | |
|----|-------------------|---|---------|---|
| KR | 20130111786 A | * | 10/2013 | |
| KR | 101422104 B1 | * | 7/2014 | |
| KR | 10-1680875 B1 | | 11/2016 | |
| KR | 10-1735470 B1 | | 5/2017 | |
| KR | 20190138918 A | * | 12/2019 | ............... G01N 3/20 |
| KR | 10-2124403 B1 | | 6/2020 | |
| SE | 459578 B | * | 7/1989 | ............ B21C 47/04 |
| WO | 2014/171247 A1 | | 10/2014 | |

* cited by examiner

ROLLING APPARATUS AND EVALUATION SYSTEM FOR EVALUATING DURABILITY OF FLEXIBLE MATERIAL

CROSS-REFERENCE TO RELATED APPLICATIONS

The present application is a Continuation of International Application No. PCT/KR2020/013943 filed on Oct. 13, 2020, which claims priority from Korean Application No. 10-2020-0027127 filed on Mar. 4, 2020. The aforementioned applications are incorporated herein by reference in their entireties.

TECHNICAL FIELD

The present disclosure relates to a rolling apparatus and an evaluation system for evaluating durability of a flexible material. More particularly, the present disclosure relates to a rolling apparatus and an evaluation system for evaluating durability of a flexible material, wherein the rolling apparatus and the evaluation system are configured to continuously maintain the flexible material in an even state thereof, and to adjust a tension of the flexible material so as to evenly maintain the tension applied to the flexible material.

RELATED ART

In general, a liquid crystal display (LCD), organic light emitting diodes (OLED), and electroluminescence (EL), etc. are types of flat panel displays (FPD) that have low power consumption, light weight and flattening characteristics, and are widely used in automobiles and aircraft as well as for monitors such as televisions, computers, and mobile phones.

Recently, in related industries, the development of a flexible display having flexibility has been actively carried out. As performance and quality of the flexible display are improved, the flexible display should not only be able to be bent, but also have durability and driving stability that can withstand bending of a certain degree or more.

More specifically, the flexible display should be able to display a normal image even in a bent state, a rolled state, and a state in which it is unrolled again conversely to the rolled state. As described above, the degree to which the flexible display can be bent within a range in which a normal image can be displayed, that is, flexibility, is one of important properties of the flexible display.

Specifically, recently, technologies are actively being developed for a foldable display that can be used by being fully folded or unfolded and a rollable display that can be used by being rolled like paper. In manufacture of the foldable display or the rollable display, development of durability evaluation apparatus to evaluate the flexibility should be preceded.

Meanwhile, components for driving the flexible display, for example, a substrate to connect the display to the outside space are also installed in the flexible display, but unlike the display, the substrate does not have flexibility in many cases. Therefore, when the flexibility of the flexible display is evaluated, it is important not to apply excessive bending force to the substrate.

In addition, in order to evaluate a very large display of 80 inches or more, an apparatus that evaluates the display must also be large, and the evaluation apparatus requires a significant space. Therefore, there is a need to evaluate large displays of 80 inches or more with more compact devices.

As related arts, Korean Patent No. 10-1680875 (Title: "Bending and rolling examination apparatus for flexible display and bending and rolling examination method using this", registered on Nov. 23, 2016) and Korean patent No. 10-1735470 (Title: Bending and rolling demonstration device for flexible display, registered on May 8, 2017) were disclosed.

SUMMARY

The present disclosure has been made keeping in mind the above problems occurring in the related art, and an objective of the present disclosure is to provide a rolling apparatus and an evaluation system for evaluating durability of a flexible material, wherein the rolling apparatus and the evaluation system are configured to maintain an even state of the flexible material, and to adjust a tension of the flexible material to maintain the tension applied to the flexible material evenly.

In order to achieve the above objective, according to one aspect of the present disclosure, a rolling apparatus for evaluating durability of a flexible material according to the present disclosure includes: a base unit; a rolling unit rotatably coupled to the base unit and around which the flexible material may be wound; and a sliding unit which may grip an end of the flexible material wound around the rolling unit and be spaced apart from the rolling unit to be slidably coupled to the base unit, wherein the sliding unit may be set to at least one of a preset speed and torque in a direction in which the flexible material is pulled, and at least one of a speed and torque of the rolling unit for an unrolling operation of the rolling unit and a rolling operation of the rolling unit may be controlled such that the flexible material may maintain a flat state.

A sliding motor for sliding movement of the sliding unit may have a rotating speed larger than a rotating speed of a rolling motor for rotation of the rolling unit.

A sliding motor for sliding movement of the sliding unit may have a torque smaller than a torque of a rolling motor for rotation of the rolling unit.

The rolling apparatus may include: a load cell unit provided at the sliding unit, and configured to measure a tension applied to the flexible material in response to sliding movement of the sliding unit.

The rolling unit may include: a pair of rolling brackets provided at the base unit while being spaced apart from each other in a width direction of the base unit; a winding shaft rotatably coupled to the pair of rolling brackets such that the flexible material may be wound between the pair of rolling brackets; and a rolling motor configured to generate a rotating force to rotate the winding shaft.

The rolling unit may include: a reciprocatively attaching and detaching part configured to removably couple the winding shaft to the rolling motor.

The sliding unit may include: a sliding rail formed in a long shape in a longitudinal direction of the base unit; a slider slidably coupled to the sliding rail; a sliding motor configured to generate a rotating force; and a sliding changing part configured to move the slider by the rotating force of the sliding motor.

The sliding unit may include: a connecting bracket provided at the slider to face toward the sliding changing part, and removably coupled to the sliding changing part.

An evaluation system for evaluating durability of a flexible material according to the present disclosure may include: a rolling apparatus according to the present disclosure; a work plate unit coupled to a base unit; and a module supporting unit provided at the work plate unit, and configured to support a rolling motor provided at a rolling unit and a sliding motor provided at a sliding unit.

The evaluation system may include: an apparatus holding unit configured to removably hold the base unit at the work plate unit.

According to the rolling apparatus and the evaluation system for evaluating durability of a flexible material of the present disclosure, the flexible material can continuously maintain the even state thereof, and it is possible to adjust a tension of the flexible material so that the tension applied to the flexible material can be evenly maintained.

Furthermore, according to the present disclosure, as the rolling unit and the sliding unit are coupled to each other at the base unit, an initial setting of the flexible material is clarified, an individual sliding operation of the sliding unit and an individual rotating operation of the rolling unit are operated clearly in conjunction with each other, and unlike the conventional evaluation apparatus, the rolling unit is prevented from being moved and the flexible material from wrinkling.

Furthermore, according to the present disclosure, by the relation between a rotating speed of the sliding motor and a rotating speed of the rolling motor, the flexible material can maintain a tightly stretched state thereof, and a rolling operation and an unrolling operation of the flexible material can be stably realized.

Furthermore, according to the present disclosure, by the relation between a torque of the sliding motor and a torque of the rolling motor, the flexible material can maintain a tightly stretched state thereof, and a rolling operation and an unrolling operation of the flexible material can be stably realized.

Furthermore, according to the present disclosure, as the load cell unit is additionally provided, a tension of the flexible material is monitored in real time with respect to a rolling operation and an unrolling operation of the flexible material, and the tension of the flexible material can be measured or calculated.

Furthermore, according to the present disclosure, by the detailed structure of the rolling unit, the winding shaft can be rotatably held on the base unit.

Furthermore, according to the present disclosure, as the rolling unit includes the first gripping shaft and the second gripping shaft, it is possible to prevent the winding shaft from being moved.

Furthermore, according to the present disclosure, as the rolling unit includes the rolling lever, the winding shaft can be rotated in manual, and the initial tension of the flexible material can be adjusted.

Furthermore, according to the present disclosure, as the rolling unit includes the rolling check part, the number of rotations of the winding shaft can be measured, and the amount of winding of the flexible material around the winding shaft can be calculated.

Furthermore, according to the present disclosure, as the rolling unit includes the brake, a stopped state of the winding shaft at a predetermined location can be maintained.

Furthermore, according to the present disclosure, as the rolling unit includes the reciprocatively attaching and detaching part, the winding shaft and the rolling motor are removably coupled to each other, and the winding shaft is separable from the rolling motor so that replacement and maintenance of the rolling apparatus can be simplified according to the specifications of the flexible material.

Furthermore, according to the present disclosure, by the detailed structure of the sliding unit, the slider can be slidably moved at the base unit, and linear movement of the slider is stabilized by a rotating force of the sliding motor so that linear reciprocating movement of the flexible material can be clarified.

Furthermore, according to the present disclosure, as the sliding unit includes the connecting bracket, the connecting bracket and the sliding changing part are removably coupled to each other and the connecting bracket and the slider are separable from the sliding changing part, so that the replacement and the maintenance of the rolling apparatus can be simplified according to the specifications of the flexible material.

Furthermore, according to the present disclosure, as the sliding unit includes the slider, relatively sliding movement between the slider and the flexible material can be realized to correspond to linear movement of the flexible material, and it is possible to prevent the flexible material from being deformed or broken.

Furthermore, according to the present disclosure, by the detailed structure of the sliding changing part in the sliding unit, a rotating movement of the sliding motor is converted into a linear reciprocating movement of the slider so that the sliding movement of the slider can be efficiently performed.

Furthermore, according to the present disclosure, as the sliding unit includes the changing part cover, the sliding changing part can be protected and the change-movable member of the sliding changing part can have a clear sliding path.

Furthermore, according to the present disclosure, by the additional structure of the load cell unit and the coupling relation between the load cell unit and the slider, a tension applied to the flexible material in response to sliding of the slider can be easily calculated, and the first movable member and the second movable member that are separated from each other can be slidably coupled to each other.

Furthermore, according to the present disclosure, by the additional structure of the work plate unit, the base unit of the rolling apparatus can be recovered to an original location, and it is possible to prevent the base unit from being moved to correspond to an operation of the rolling apparatus.

Furthermore, according to the present disclosure, by the additional structure of the module supporting unit, the rolling motor, the sliding motor, and the reciprocating unit of the rolling apparatus can be held on regular locations thereof, and power transmission system can be clarified.

Furthermore, according to the present disclosure, by the additional structure of the apparatus holding unit, the base unit can be attached to and detached from the work plate unit, so that the replacement and the maintenance of the rolling apparatus can be simplified according to the specifications of the flexible material.

Furthermore, according to the present disclosure, by the additional structure of the reciprocating unit, attachment and detachment between the work plate unit and the base unit can be easily performed, and attachment and detachment between the shafts of the rolling unit and the sliding unit can be efficiently performed.

Furthermore, according to the present disclosure, as the additional structure of the control unit, an operation of the rolling apparatus is classified, and various signals in response to the operation of the rolling apparatus can be transmitted to the outside space in a wired or wireless method and used for big data.

Furthermore, according to the present disclosure, by the additional structure of the display, a status value in response to an operation of the rolling apparatus can be indicated, and an operational state of the rolling apparatus can be monitored.

DETAILED DESCRIPTION

Figure 1:
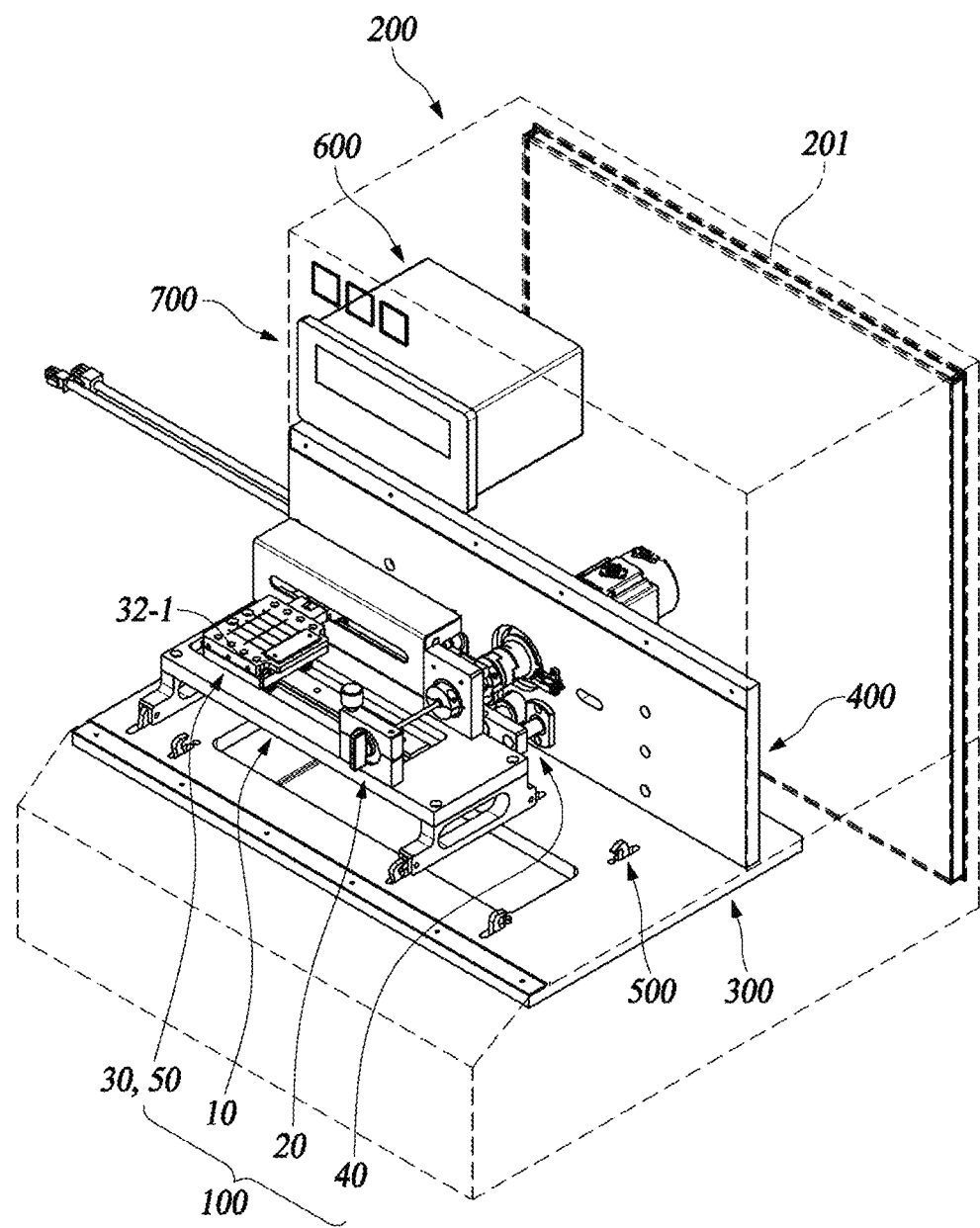
FIG. 1 is a perspective view showing an evaluation system for evaluating durability of a flexible material according to an embodiment of the present disclosure.
Figure 2:
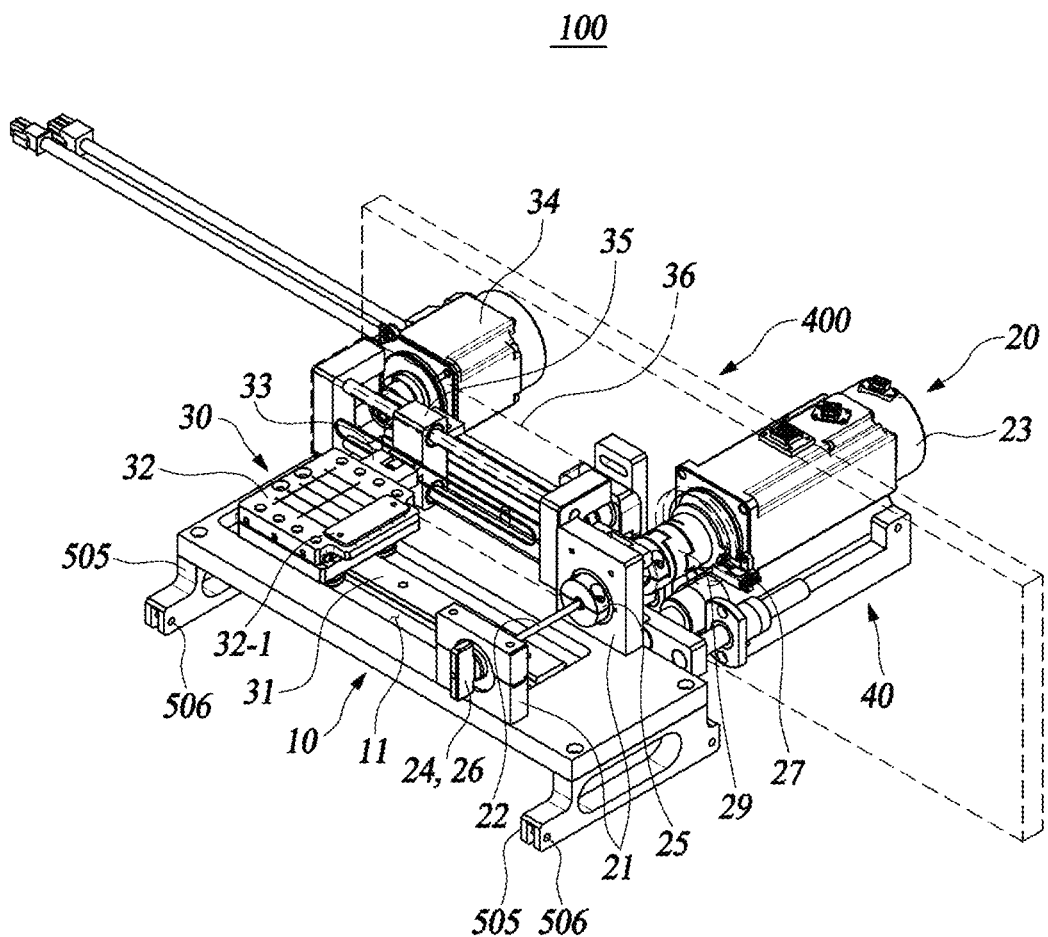
FIG. 2 is a perspective view showing a rolling apparatus for evaluating durability of a flexible material in the evaluation system for evaluating durability of a flexible material according to the embodiment of the present disclosure.
Figure 3:
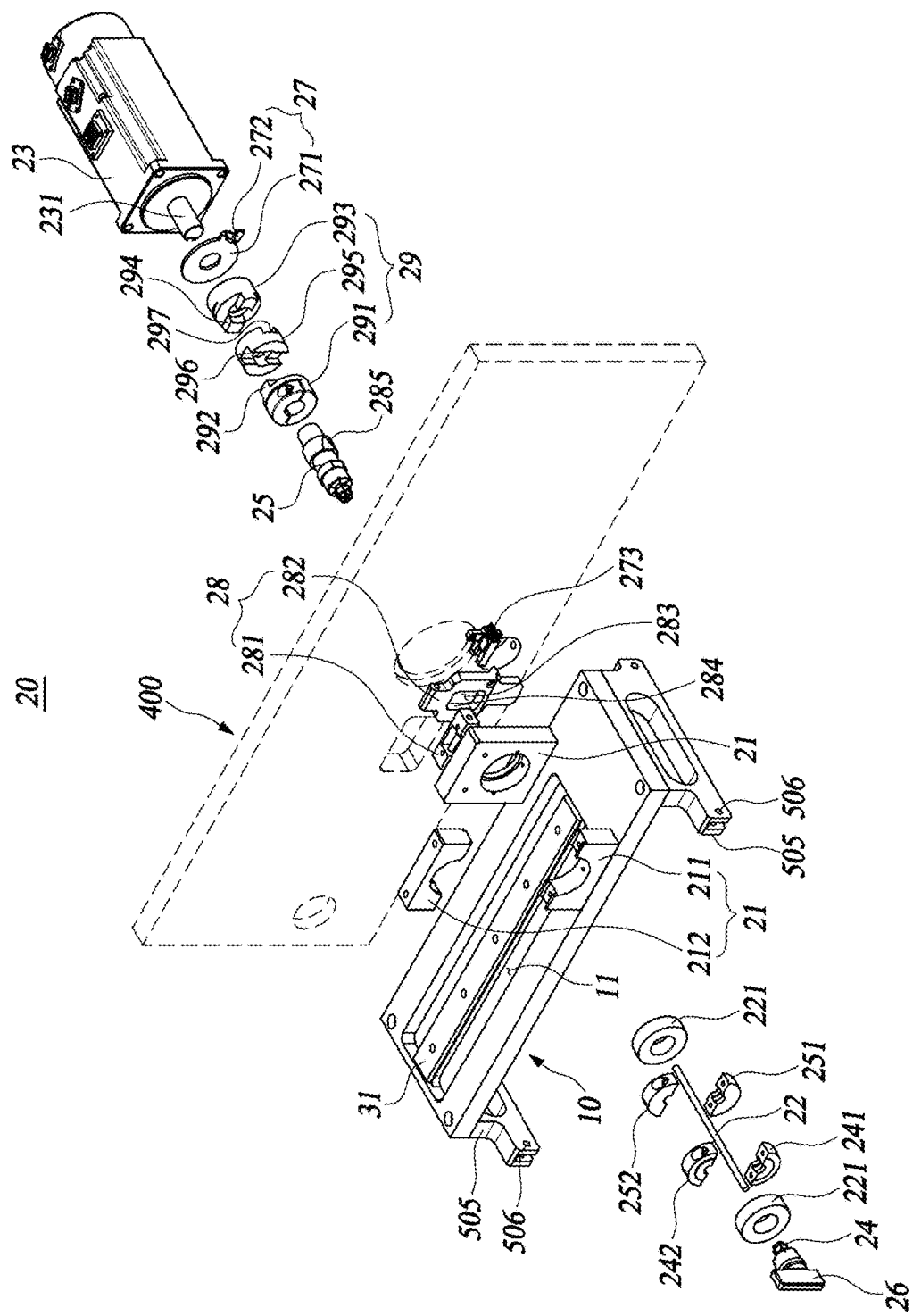
FIG. 3 is an exploded-perspective view showing a rolling unit in the rolling apparatus for evaluating durability of a flexible material according to the embodiment of the present disclosure.

Hereinbelow, a rolling apparatus and an evaluation system for evaluating durability of a flexible material according to an embodiment of the present disclosure will be described with reference to accompanying drawings. Herein, the present disclosure is not limited to the embodiment described herein. Furthermore, in the following description of the present disclosure, detailed descriptions of known functions and components incorporated herein will be omitted so as to clarify the subject matter of the present disclosure.

According to an embodiment of the present disclosure, an evaluation system for evaluating durability of a flexible material may include a rolling apparatus 100 and a system main body 200.

The rolling apparatus 100 realizes a rolling operation and an unrolling operation of a flexible material F. The rolling apparatus 100 may be the rolling apparatus 100 for evaluating the durability of the flexible material F according to an embodiment of the present disclosure.

According to the embodiment of the present disclosure, the flexible material F may include various sheets, various films, flexible displays, etc., and around which the flexible material F may be wound or wrapped. According to the embodiment of the present disclosure, when the flexible material F is folded, the flexible material F loses the function thereof.

According to the embodiment of the present disclosure, the rolling apparatus 100 for evaluating the durability of the flexible material F includes a base unit 10, a rolling unit 20, and a sliding unit 30, and may include a load cell unit 50.

The base unit 10 provides the rolling apparatus 100. The base unit 10 has a rail seating groove 11 formed by being recessed to correspond to a sliding rail 31 of the sliding unit 30.

The rolling unit 20 is rotatably coupled to the base unit 10. The flexible material F is wound around the rolling unit 20.

The rolling unit 20 may include a pair of rolling brackets 21, a winding shaft 22, and a rolling motor 23.

The pair of rolling brackets 21 are provided at the base unit 10. The pair of rolling brackets 21 are arranged while being spaced apart from each other in a width direction of the base unit 10. The width direction of the base unit 10 is substantially parallel to a longitudinal direction of the winding shaft 22, and is substantially perpendicular to a sliding direction of the sliding unit 30. The pair of rolling brackets 21 has a rolling hole formed by penetrating therethrough to be coupled to the winding shaft 22.

At least any one of the pair of rolling brackets 21 may be bisected into a first bracket 211 and a second bracket 212 on the basis of the rolling hole. The first bracket 211 is fixed to the base unit 10, and the second bracket 212 is removably stacked and supported by the first bracket 211. The first bracket 211 and the second bracket 212 are removably coupled to each other with a bracket coupling part as a medium. The bracket coupling part may be a bolt member of which a head part is supported by the second bracket 212 and a screw part passes through the second bracket 212 and screwed to the first bracket 211.

The winding shaft 22 is rotatably coupled to the pair of rolling brackets 21. The winding shaft 22 allows the flexible material F to be wound between the pair of rolling brackets 21. Opposite ends of the winding shaft 22 are respectively supported by bearings 221 respectively coupled to the pair of rolling brackets 21.

In the embodiment of the present disclosure, a first end of the winding shaft 22 is coupled to a rolling lever 26, which will be described later, and a second end of the winding shaft 22 is coupled to the rolling motor 23.

The rolling motor 23 generates a rotating force to rotate the winding shaft 22. The rolling motor 23 may be a servo motor capable of adjusting a rotating speed and torque. The rolling motor 23 may adjust the rotating speed to be equal to or less than 100 mm/sec, and adjust the torque at a unit of 10 gf~100 gf. The rolling motor 23 includes a rolling shaft 231 that is concentrically connected to the winding shaft 22.

The rolling unit 20 may include a first gripping shaft 24 and a second gripping shaft 25.

The first gripping shaft 24 is rotatably coupled to any one of the pair of rolling brackets 21 while being coupled to a first portion of the winding shaft 22. The first gripping shaft 24 is coupled to a lever bracket to stably couple the first gripping shaft 24 to the winding shaft 22. The lever bracket may be bisected into a first lever bracket 241 and a second lever bracket 242 on the basis of the first gripping shaft 24. The first lever bracket 241 and the second lever bracket 242 are removably coupled to each other with a first holding-coupling part as a medium. The first holding-coupling part may be a bolt member of which a head part is supported by the second lever bracket 242 and a screw part passes through the second lever bracket 242 to be screwed to the first lever bracket 241.

The second gripping shaft 25 is rotatably coupled to another one of the pair of rolling brackets 21 while being coupled to a second portion of the winding shaft 22. The second gripping shaft 25 is coupled to a motor bracket, so that the second gripping shaft 25 may be coupled to the winding shaft 22. The motor bracket may be bisected into a first motor bracket 251 and a second motor bracket 252 on the basis of the second gripping shaft 25. The first motor bracket 251 and the second motor bracket 252 are removably coupled to each other with a second holding-coupling part as a medium. The second holding-coupling part may be a bolt member of which a head part is supported by a second motor bracket and a screw part passes through the second motor bracket 252 to be screwed to the first motor bracket 251.

The rolling unit 20 may include at least any one of the rolling lever 26, a rolling check part 27, a brake 28, and a reciprocatively attaching and detaching part 29.

The rolling lever 26 protrudes from the first gripping shaft 24. When a user grips the rolling lever 26, the winding shaft 22 may be rotated in manual.

The rolling check part 27 may count the number of rotations of the winding shaft 22. The rolling check part 27 may include a shaft supporting part 271 coupled to the second portion of the winding shaft 22 or the second gripping shaft 25 or the rolling shaft 231 of the rolling motor 23, and a protrusion pointing part 272 protruding from the shaft supporting part 271, and a pointing sensing part 273 spaced outward from the shaft supporting part 271 to detect the protrusion pointing part 272. The shaft supporting part 271 may have a ring shape.

Then, the pointing sensing part 273 senses the protrusion pointing part 272 in response to the rotation of the winding shaft 22 so as to count the number of rotations of the winding shaft 22.

The brake 28 may hold the winding shaft 22. The brake 28 may include a pivot supporting part 281 provided at the another one of the pair of rolling brackets 21, and a brake lever 282 coupled to the pivot supporting part 281 to be pivot-movable. The brake lever 282 has a shaft-pass hole 283 through which the winding shaft 22 or the second gripping shaft 25 is formed by penetrating through the brake lever. Then, when the brake lever 282 is in a location substantially parallel with the another one of the pair of rolling brackets 21 in the initial state thereof, the winding shaft 22 or the second gripping shaft 25 is rotatably arranged in the shaft-pass hole 283 so that the brake lever 282 does not interfere with the rotation of the winding shaft 22. When the brake lever 282 is moved in a pivot manner to be located at a location inclined with respect to the another one of the pair of rolling brackets 21, as a first supporting surface 284 formed on an inside surface of the shaft-pass hole 283 and a second supporting surface 285 formed on an outside surface of the winding shaft 22 or the second gripping shaft 25 are brought in contact or close contact with each other, the brake lever 282 may be held by the winding shaft 22 or the second gripping shaft 25 so as to prevent the winding shaft 22 from being rotated.

The reciprocatively attaching and detaching part 29 removably couples the rolling shaft 231 of the rolling motor 23 to the winding shaft 22. The reciprocatively attaching and detaching part 29 may removably couple the rolling shaft 231 of the rolling motor 23 to the second gripping shaft 25.

The reciprocatively attaching and detaching part 29 may include a first tap part 291 coupled to the winding shaft 22 or the second gripping shaft 25, and a second tap part 293 coupled to the rolling shaft 231 of the rolling motor 23. At least two first attaching and detaching parts 292 are formed by protruding from the first tap part 291 toward the second tap part 293 while being spaced apart from each other. At least two second attaching and detaching parts 294 are formed by protruding from the second tap part 293 toward the first tap part 291 while being spaced apart from each other. Then, as the first tap part 291 and the second tap part 293 are connected to each other so as to alternately arranged the first attaching and detaching parts 292 and the second attaching and detaching parts 294, the rotating force of the rolling shaft 231 may be transmitted to the winding shaft 22. Then, when the base unit 10 is moved to correspond to a shaft direction of the winding shaft 22, the first tap part 291 and the second tap part 293 are separated from each other.

The reciprocatively attaching and detaching part 29 may include a joint part 295 located between the first tap part 291 and the second tap part 293 and into which both the first tap part 291 and the second tap part 293 are fitted. The joint part 295 includes a first joint attaching and detaching part 296 formed by recessing a surface of the joint part 295 facing the first tap part 291 so as to correspond to the first attaching and detaching parts 292, and a second joint attaching and detaching part 297 formed by recessing a surface of the joint part facing the second tap part 293 so as to correspond to the second attaching and detaching parts 294. Then, the first attaching and detaching parts 292 is fitted-coupled to the first joint attaching and detaching part 296, and the second attaching and detaching parts 294 is fitted-coupled to the second joint attaching and detaching part 297, so that the rotating force of the rolling shaft 231 may be transmitted to the winding shaft 22. Then, when the base unit 10 is moved to correspond to a shaft direction of the winding shaft 22, the first tap part 291, the joint part 295, and the second tap part 293 are separated from each other. At this point, when the reciprocatively attaching and detaching part 29 includes the first tap part 291, the joint part 295, and the second tap part 293, and when the first joint attaching and detaching part 296 is formed by recessing the first tap part 291, the first attaching and detaching parts 292 is formed by protruding from the joint part 295, and when the second joint attaching and detaching part 297 is formed by recessing the second tap part 293, the second attaching and detaching parts 294 is formed by protruding from the joint part 295.

The sliding unit 30 grips an end of the flexible material F wound around the rolling unit 20. The sliding unit 30 is spaced apart from the rolling unit 20 and slidably coupled to the base unit 10.

The sliding unit 30 includes the sliding rail 31, a slider 32, a sliding motor 34, and a sliding changing part 35.

The sliding rail 31 is formed in a long shape in a longitudinal direction of the base unit 10. The longitudinal direction of the base unit 10 is referred to as a direction substantially perpendicular to a width direction of the base unit 10 or a shaft direction of the winding shaft 22.

The slider 32 is slidably coupled to the sliding rail 31. The slider 32 may include a first movable member 321, a second movable member 323 stacked-coupled to the first movable member 321 in a slidable manner, a member-sliding part 324 movably coupled the second movable member 323 to the first movable member 321, and a guide-movable part slidably coupled to the sliding rail 31 while being coupled to the first movable member 321.

The slider 32 may include a material holding part 23-1 coupled to the second movable member 323 in the stackable manner. The end of the flexible material F is inserted between the material holding part 23-1 and the second movable member 323 and the material holding part 23-1 is coupled to the second movable member 323, so that the end of the flexible material F may be held to the slider 32.

At least one of the first movable member 321 and the second movable member 323 may have a cell seating part 322, which is formed in a recessing manner and accommodates the load cell unit 50, which will be described later, therein.

The member-sliding part 324 may include a first sliding part coupled to the first movable member 321, a second sliding part coupled to the second movable member so as to face the first sliding part, and a reducer arranged between the first sliding part and the second sliding part to reduce friction. The member-sliding part 324 is arranged such that a pair of member-sliding parts 324 are spaced apart from each other, and the load cell unit 50, which will be described later, is arranged between the pair of member-sliding parts 324 so as to stably detect the load.

Figure 4:
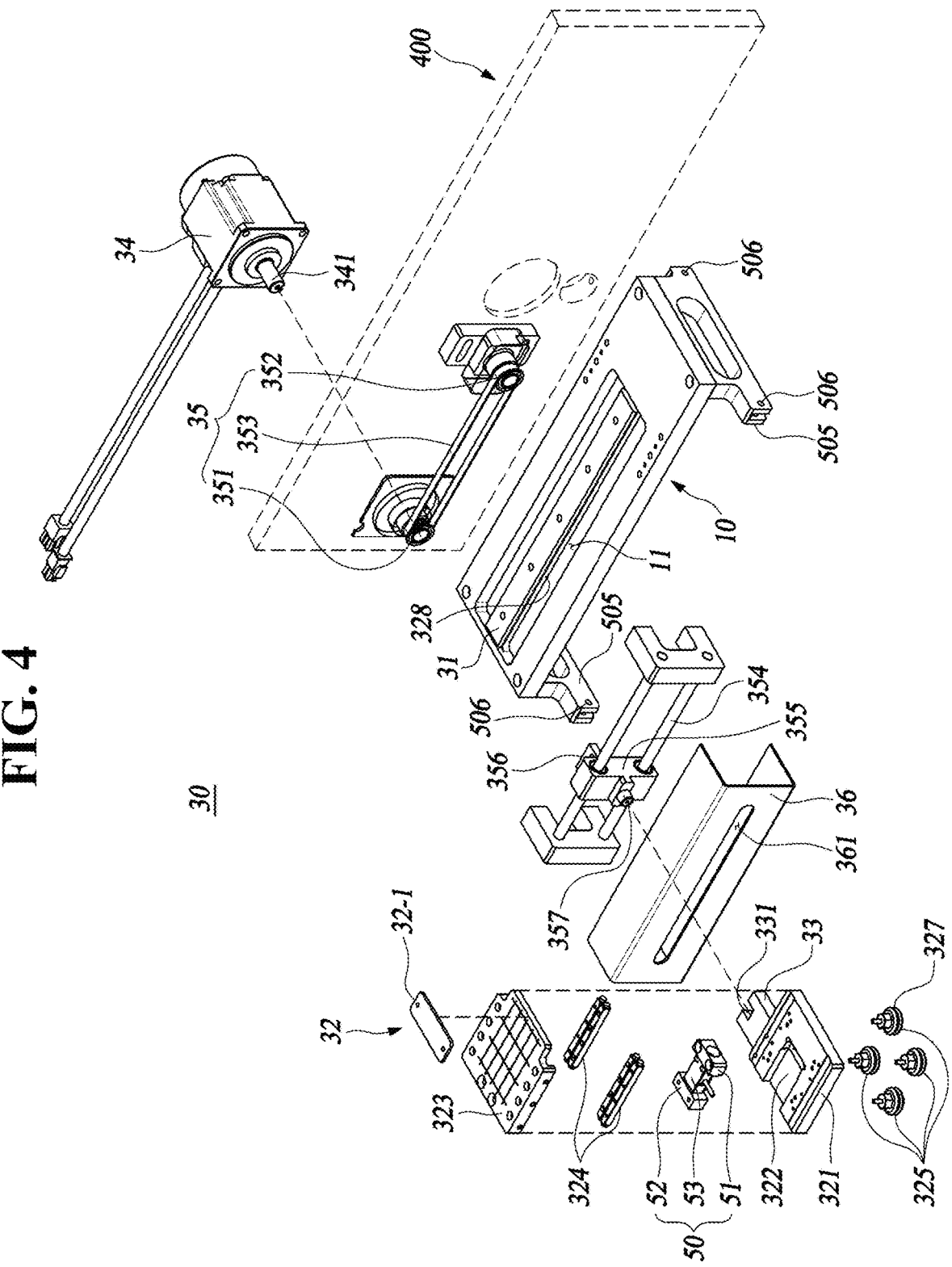
FIG. 4 is an exploded-perspective view showing a sliding unit in the rolling apparatus for evaluating durability of a flexible material according to the embodiment of the present disclosure.

As an example, as shown in FIG. 4, the guide-movable part may consist of a plurality of guide rollers 325 rotatably coupled to the first movable member 321 so as to be supported by long-side opposite surfaces of the sliding rail 31.

Figure 5:
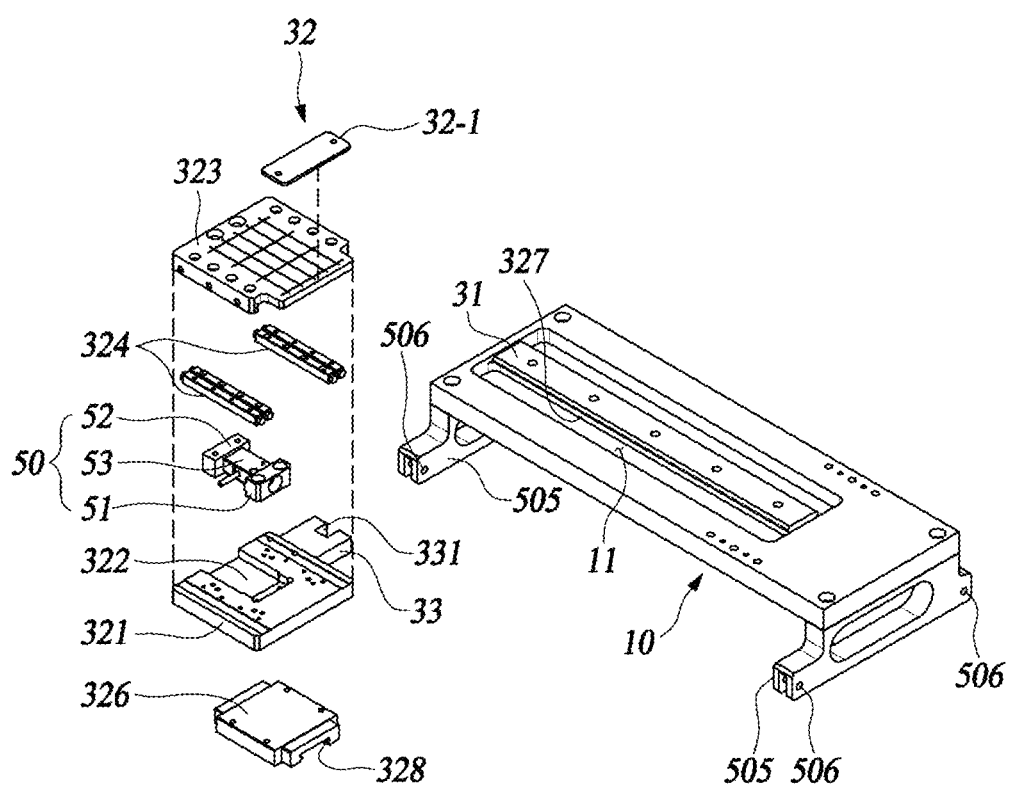
FIG. 5 is an exploded-perspective view showing a modification example of a sliding rail and a slider of the sliding unit in the rolling apparatus for evaluating durability of a flexible material according to the embodiment of the present disclosure.
Figure 6:
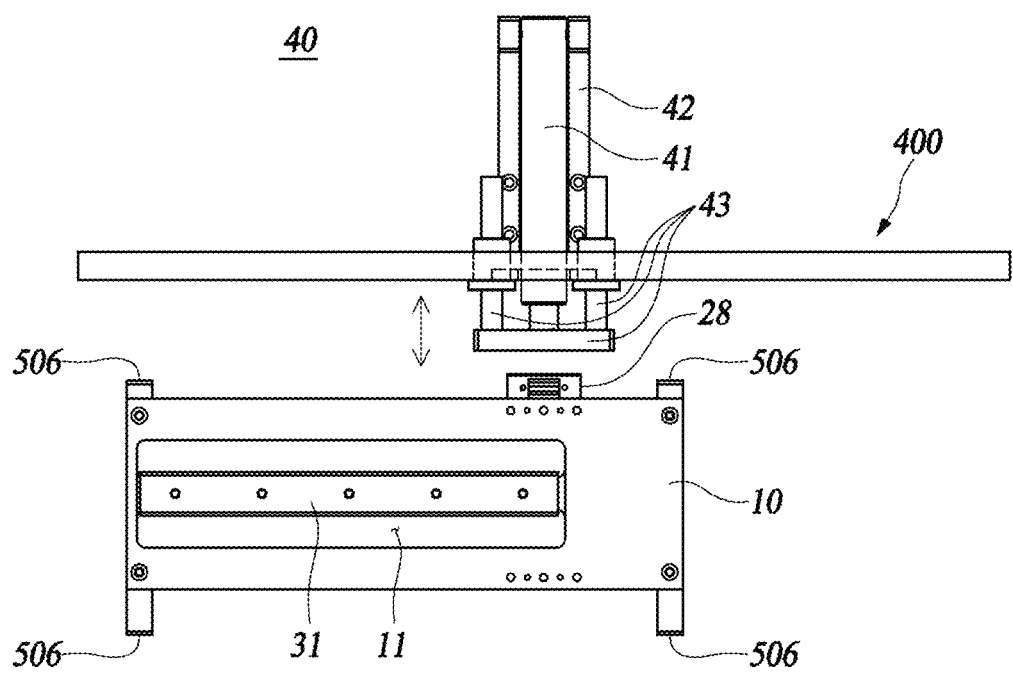
FIG. 6 is a plan view showing a reciprocating unit in the rolling apparatus for evaluating durability of a flexible material according to the embodiment of the present disclosure.
Figure 7:
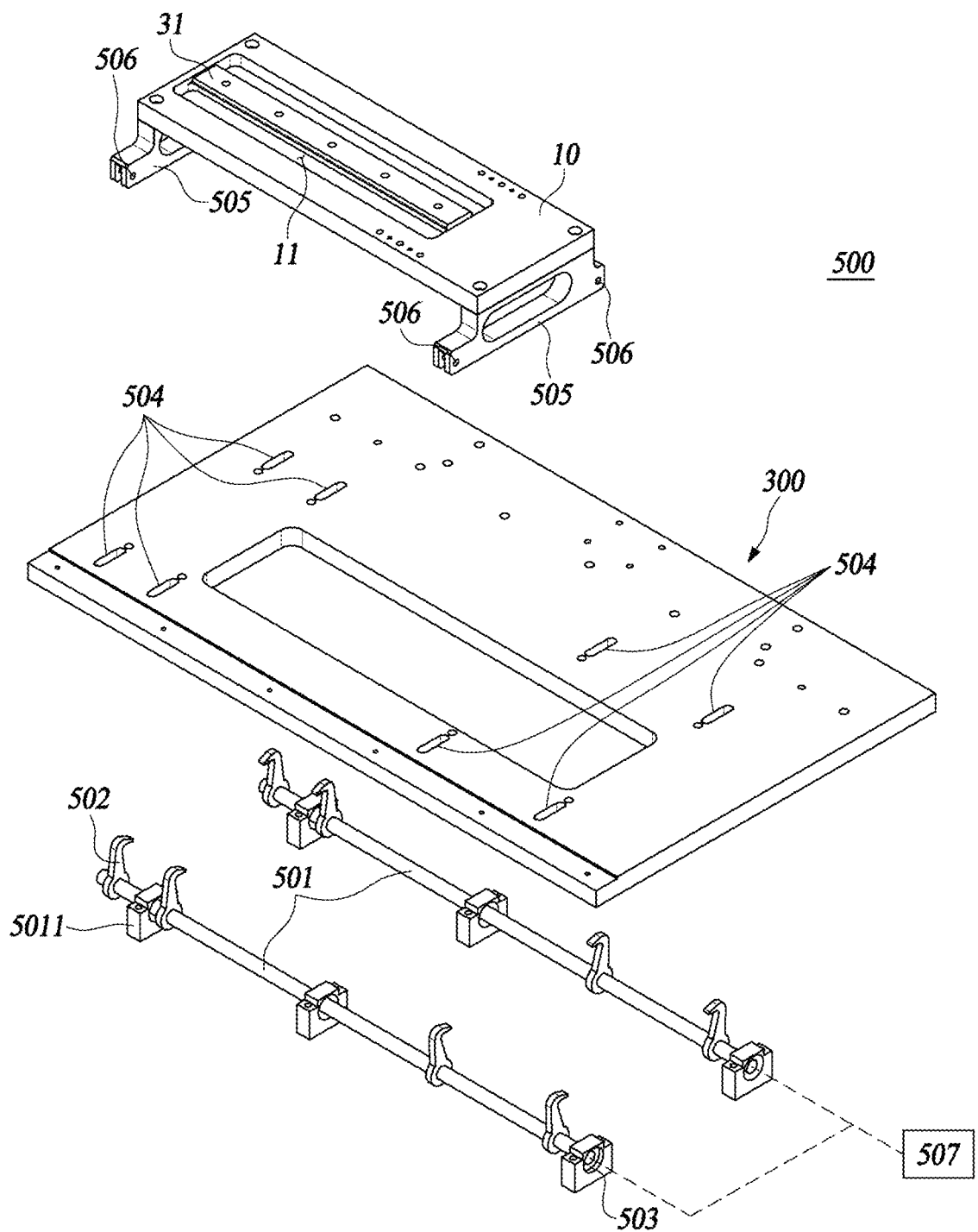
FIG. 7 is an exploded-perspective view showing a holding unit in the evaluation system for evaluating durability of a flexible material according to the embodiment of the present disclosure.
Figure 8:
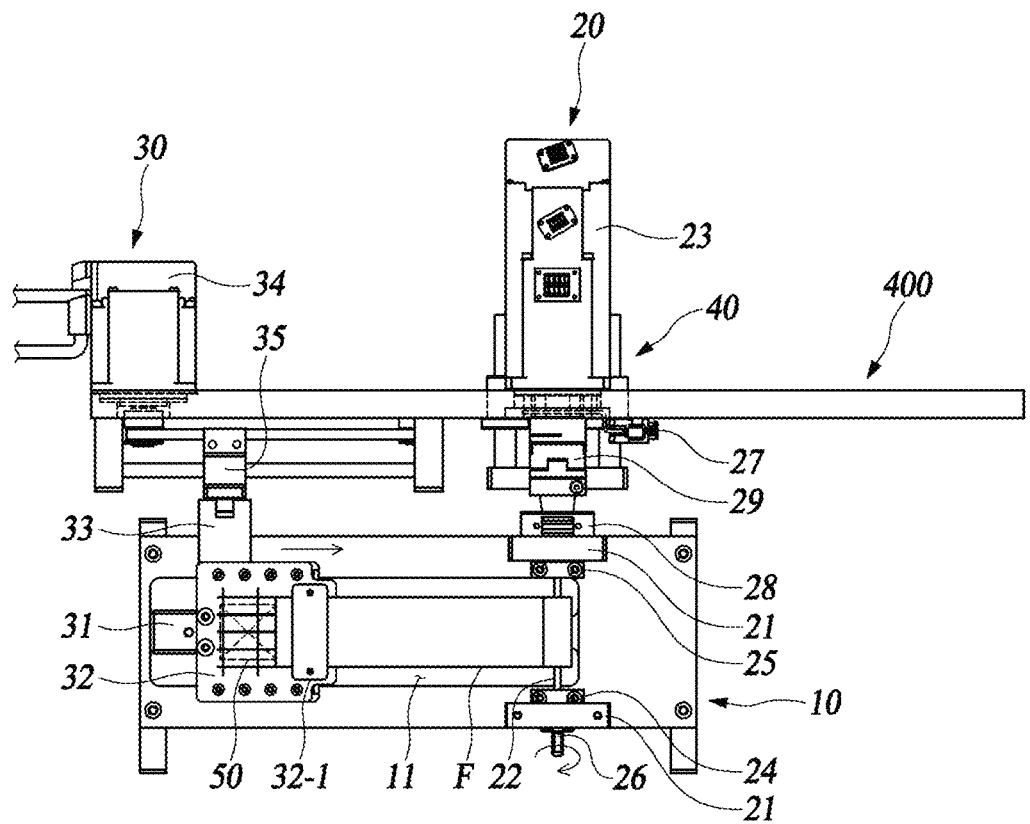
FIG. 8 is a plan view showing the flexible material released from the rolling unit in the rolling apparatus for evaluating durability of a flexible material according to the embodiment of the present disclosure.
Figure 9:
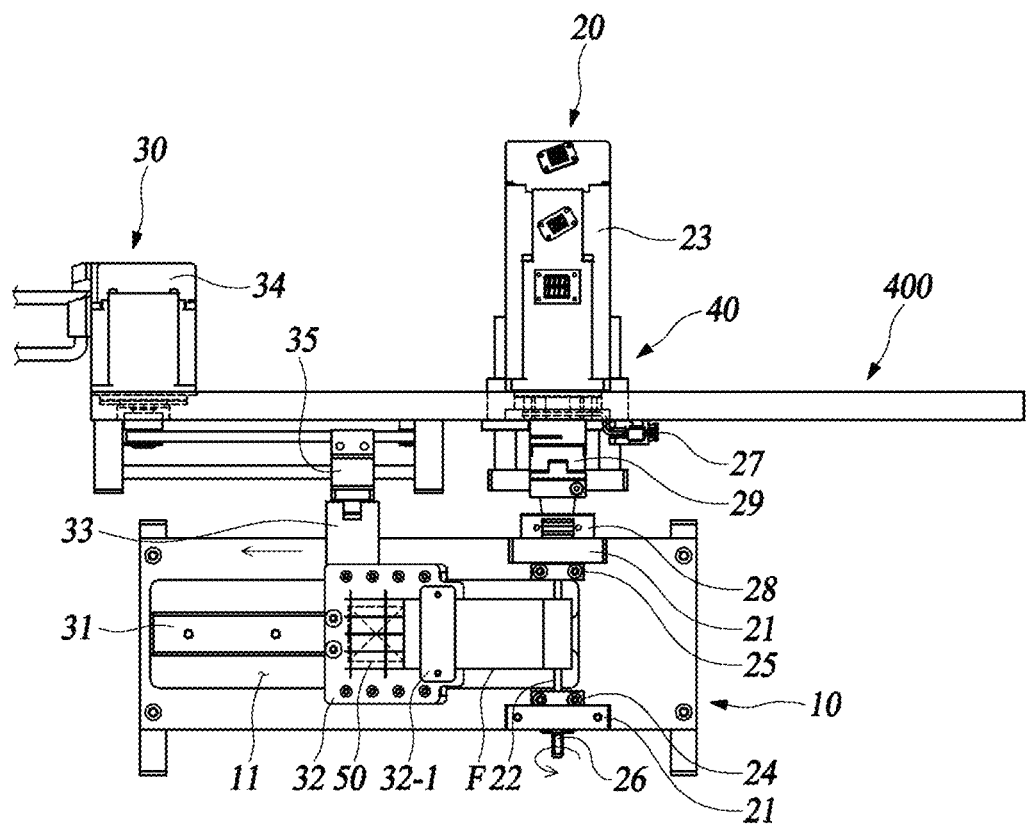
FIG. 9 is a plan view showing the flexible material wound around the rolling unit in the rolling apparatus for evaluating durability of a flexible material according to the embodiment of the present disclosure.

As another example, as shown in FIG. 5, the guide-movable part may consist of a guide channel 326 having a channel shape, and the guide channel 326 is coupled to the first movable member 321 so as to surround and support the sliding rail 31.

Any one of the sliding rail 31 and the slider 32 has a long guide groove 327 formed in a recessing manner in a longitudinal direction of the sliding rail 31, and another one of the sliding rail 31 and the slider 32 has a guide protrusion 328 fitted into the guide groove 327 to slide along the guide groove 327, so that coupling between the sliding rail 31 and the slider 32 is stabilized and the slider 32 is prevented from being arbitrarily separated from the sliding rail 31.

As an example, as shown in FIG. 4, the long guide protrusion 328 protrudes on the long-side opposite surfaces of the sliding rail 31, and the guide groove 327 may be recessed on a circumferential surface of each of the guide rollers 325 of the slider 32. When the guide groove 327 is formed by recessing each of the long-side opposite surfaces of the sliding rail 31, the guide protrusion 328 may be formed by protruding from the circumferential surface of each of the guide rollers 325 of the slider 32.

As another example, as shown in FIG. 5, the guide groove 327 is formed by recessing each of the long-side opposite surfaces of the sliding rail 31, and the guide protrusion 328 may be formed by protruding on an inside surface of the guide channel 326 of the slider 32. When the long guide protrusion 328 is formed by protruding on each of the long-side opposite surfaces of the sliding rail 31, the guide groove 327 may be formed by recessing the inside surface of the guide channel 326 of the slider 32.

The sliding motor 34 generates a rotating force for sliding of the slider 32. The sliding motor 34 is coupled to the sliding changing part 35. The sliding motor 34 may be a servo motor capable of adjusting a rotating speed and torque. The sliding motor 34 may adjust the rotating speed to be equal to or less than 100 mm/sec, and adjust the torque at a unit of 10 gf~100 gf. The sliding motor 34 includes a sliding shaft 341 connected to the sliding changing part 35.

The sliding changing part 35 slidably moves the slider 32 by the rotating force of the sliding motor 34. The sliding changing part 35 may include a drive roller 351, an idle roller 352, a transmission belt 353, a sliding guide 354, and a change-movable member 355.

The drive roller 351 is coupled to the sliding shaft 341 of the sliding motor 34 and is rotated by the sliding motor 34. The drive roller 351 is rotatably coupled to a module supporting unit 400.

The idle roller 352 is rotatably while being spaced apart from the drive roller 351 in the longitudinal direction of the base unit 10. The idle roller 352 is rotatably coupled to the module supporting unit 400. As the idle roller 352 is coupled to the module supporting unit 400 so as to be slidable in the longitudinal direction of the base unit 10, thereby adjusting the tension of the transmission belt 353.

The transmission belt 353 connects the drive roller 351 to the idle roller 352 in a caterpillar track manner.

The drive roller 351 and the idle roller 352 consist of timing pulleys, and the transmission belt 353 consists of a timing belt, so that the rotating force of the sliding motor 34 may be stably transmitted, and the transmission belt 353 may be stably moved in the caterpillar track manner without slipping.

The sliding guide 354 is formed long in the longitudinal direction of the base unit 10 while being spaced apart from the transmission belt 353. The sliding guide 354 forms a path of the change-movable member 355.

The change-movable member 355 is slidably coupled to the sliding guide 354 while being held to the transmission belt 353. The change-movable member 355 includes a belt bracket 356 for being coupled to the transmission belt 353, and an attaching and detaching protrusion 357 for being removably coupled to the slider 32.

The sliding unit 30 may include a connecting bracket 33 provided at the first movable member 321 of the slider 32 and facing toward the sliding changing part 35.

The connecting bracket 33 is removably coupled to the attaching and detaching protrusion 357 of the sliding changing part 35. As an attaching and detaching groove 331 is formed by recessing the connecting bracket 33 so that the attaching and detaching protrusion 357 is fitted into the attaching and detaching groove 331, in response to the fitted-coupling between the attaching and detaching groove 331 and the attaching and detaching protrusion 357, the connecting bracket 33 and the change-movable member 355 of the sliding changing part 35 may be removably coupled to each other.

The sliding unit 30 may include a changing part cover 36 to surround and protect the sliding changing part 35. The changing part cover 36 has a sliding hole 361 formed long by penetrating the changing part cover in the longitudinal direction of the base unit 10. As the attaching and detaching protrusion 357 of the change-movable member 355 is exposed through or passes through the sliding hole 361, the attaching and detaching groove 331 and the attaching and detaching protrusion 357 from the connecting bracket 33 and the change-movable member 355 may be easily coupled to each other in the fitted manner, and the attaching and detaching protrusion 357 may slide smoothly, and the amount of movement of the attaching and detaching protrusion 357 may be limited.

The load cell unit 50 is provided in the sliding unit 30. The load cell unit 50 measures a tension applied to the flexible material F in response to sliding of the sliding unit 30. The load cell unit 50 is seated on and supported by the cell seating part 322.

The load cell unit 50 may include a first coupling member 51, a second coupling member 52, and a tension detecting member 53. The first coupling member 51 is coupled to the first movable member 321 of the slider 32. The second coupling member 52 is spaced apart from the first coupling member 51 on the substantially same level as the first coupling member 51 and is coupled to the second movable member 323 of the slider 32. The tension detecting member 53 has opposite ends, which are respectively coupled to the first coupling member 51 and the second coupling member 52, so as to measure a tension of the flexible material F to correspond to the sliding of the slider 32.

Then, when the rolling unit 20 is controlled, the first movable member 321 is moved along the sliding rail 31 away from the winding shaft 22 in response to the movement of the slider 32 away from the winding shaft 22 of the rolling unit 20, and the second movable member 323 gripping the end of the flexible material F is slidably moved relatively from the first movable member 321 such that the load cell unit 50 is compressed or extended to correspond to the tension of the flexible material F, so that the load cell unit 50 may measure the tension applied to the flexible material F.

Furthermore, when the rolling unit 20 is controlled, the first movable member 321 is moved along the sliding rail 31 closer to the winding shaft 22 in response to the movement of the slider 32 closer to the winding shaft 22 of the rolling unit 20, and the second movable member 323 gripping the end of the flexible material F is slidably moved relatively from the first movable member 321 such that the load cell unit 50 is compressed or extended to correspond to the tension of the flexible material F, so that the load cell unit 50 may measure the tension applied to the flexible material F.

Therefore, the sliding unit 30 is set to at least one of a preset speed and torque in a direction in which the flexible material F is pulled. Then, in order to maintain the flexible material F in a flat state, at least one of a speed or torque of the rolling unit 20 for an unrolling operation of the rolling unit 20 and a rolling operation of the rolling unit 20 is controlled.

Specifically, a rotating speed of the sliding motor 34 for sliding of the sliding unit 30 is set larger than a rotating speed of the rolling motor 23 for rotation of the rolling unit 20. Herein, as the slider 32 is slidably moved only in a direction away from the winding shaft 22, a moving speed of the slider 32 is respectively larger than a moving speed of the flexible material F released from the winding shaft 22 with respect to the unrolling operation of the rolling unit 20, the slider 32 continues to pull the flexible material F. Furthermore, as the slider 32 is slidably moved only in a direction away from the winding shaft 22, the slider 32 may pull the flexible material F in the opposite directions with respect to the rolling operation of the rolling unit 20. Then, the flatness the flexible material F increases between the winding shaft 22 of the rolling unit 20 and the slider 32 of the sliding unit 30, and the flexible material F is tightly stretched.

However, when a rotating speed of the sliding motor 34 is equal to or less than a rotating speed of the rolling motor 23, as the slider 32 is slidably moved in the direction away from the winding shaft 22, a moving speed of the slider 32 is relatively smaller than a moving speed of the flexible material F released from the winding shaft 22 with respect to the unrolling operation of the rolling unit 20, so that the flexible material F may sag or bend.

Furthermore, a torque of the sliding motor 34 for sliding of the sliding unit 30 is set smaller than a torque of the rolling motor 23 for rotation of the rolling unit 20. Herein, as the slider 32 is slidably moved in the direction away from the winding shaft 22, the slider 32 pulls the flexible material F in the opposite directions based on the flexible material F with respect to the rolling operation of the rolling unit 20. However, as a torque of the rolling motor 23 is relatively larger than a torque of the sliding motor 34, the slider 32 is pulled. Furthermore, as the slider 32 is slidably moved in the direction away from the winding shaft 22, the rolling unit 20 serves to gradually release the flexible material F in response to the unrolling operation of the rolling unit 20. Then, the flatness the flexible material F is maintained between the winding shaft 22 of the rolling unit 20 and the slider 32 of the sliding unit 30, and the flexible material F is tightly stretched.

However, when a torque of the sliding motor 34 is equal to or larger than a torque of the rolling motor 23, as the slider 32 is slidably moved in the direction away from the winding shaft 22, a torque of the rolling motor 23 is relatively equal to or less than a torque of the sliding motor 34 with respect to the rolling operation of the rolling unit 20, so that the rolling operation of the rolling unit 20 is not realized.

The system main body 200 is coupled to the rolling apparatus 100. As the system main body 200 has the inspection door 201 and the inspection space is opened closed by the inspection door 201, various components such as the rolling motor 23, the sliding motor 34, and the reciprocating driving part 41 of arranged in the inspection space may be maintained by opening the inspection space, and various components such as the rolling motor 23, the sliding motor 34, and the reciprocating driving part 41 arranged in the inspection space may be protected by closing the inspection space.

The system main body 200 includes a work plate unit 300 and the module supporting unit 400, includes an apparatus holding unit 500, includes a reciprocating unit 40, and may include at least any one of a control unit 600 and a display 700.

The work plate unit 300 is coupled to the base unit 10.

The module supporting unit 400 has a plate shape and is provided at the work plate unit 300. The module supporting unit 400 may be formed by protruding on an upper surface of the work plate unit 300 to be substantially perpendicular thereto. The rolling motor 23 provided in the rolling unit 20 toward an inspection and the sliding motor 34 provided in the sliding unit 30 are supported by the module supporting unit 400. The sliding changing part 35 provided at the sliding unit 30 toward the base unit 10 is supported by the module supporting unit 400. The reciprocating unit 40 is supported by the module supporting unit 400, and a reciprocating guide part 43 is exposed toward the base unit 10.

The apparatus holding unit 500 is provided to removably hold the base unit 10 to the work plate unit 300.

The apparatus holding unit 500 may include a pair of holding shafts 501, holding hooks 502, hook exposure holes 504, and base brackets 505.

The pair of holding shafts 501 are spaced apart from each other to correspond to the long-side opposite ends of the base unit 10 and are arranged in the longitudinal direction of the base unit 10. Each of the holding shafts 501 is rotatably coupled to a shaft supporting bracket 5011 coupled to the work plate unit 300.

A plurality of holding hooks 502 is arranged in a longitudinal direction of the holding shafts 501 at intervals and pivots in response to rotation of the holding shafts 501.

In order for the holding hooks 502 to be exposed toward the base unit 10 of the rolling apparatus 100 from the work plate unit 300, a plurality of hook exposure holes 504 is formed by penetrating through the work plate unit 300. The hook exposure holes 504 may be limited in size in response to the amount of pivoting of the holding hooks 502.

The base brackets 505 are coupled to the base unit 10. The base brackets 505 includes a hook-holding part 506 locked and coupled by the holding hooks 502.

The apparatus holding unit 500 may include at least any one of an elastically holding part 503 and a holding driving part 507.

The elastically holding part 503 elastically support each of the holding shafts 501 on the basis of the work plate unit 300, so that each of the holding hooks 502 is elastically supported at a location where the holding hooks is held by the hook-holding part 506. The elastically holding part 503 elastically supports each of the holding shafts 501 in a rotating direction while being supported by the shaft supporting bracket 5011, thereby maintaining a location of each of the holding hooks 502. When each of the holding shafts 501 is rotated reversely and then an external force is released so as to release the holding between the holding hook 502 and the hook-holding part 506, as the holding shaft 501 is rotated by an elastic force of the elastically holding part 503, the holding hook 502 may be recovered to the original location thereof.

The holding driving part 507 rotates the holding shafts 501 forward and reversely so as to hold and release the holding hooks 502 to and from the hook-holding part 506. The holding driving part 507 may use a rotating force of a motor or may be operated in manual.

The reciprocating unit 40 is reciprocatively coupled to the module supporting unit 400 so as to slidably move the base unit 10.

The reciprocating unit 40 may include a reciprocating driving part 41 generating a driving force for sliding of the base unit 10, a reciprocating supporting part 42 securely spacing the reciprocating driving part 41 from the base unit 10, and the reciprocating guide part 43 guiding reciprocation of the reciprocating driving part 41.

The reciprocating supporting part 42 is fixed to the module supporting unit 400, and the reciprocating guide part 43 reciprocatively coupled to the module supporting unit 400 while being coupled to the reciprocating driving part 41, and the reciprocating guide part 43 is reciprocated in response to operation of the reciprocating driving part 41 to push the base unit 10 so as to assist releasing of the coupling of the apparatus holding unit 500, and separation between the rolling shaft 231 of the rolling motor 23 and the winding shaft 22 (in other words, separation of the reciprocatively attaching and detaching part 29) and separation between the change-movable member 355 of the sliding changing part 35 and the connecting bracket 33 are easily achieved.

The control unit 600 controls an operation of the rolling apparatus 100. The control unit 600 may control an operation of the rolling motor 23 and an operation of the sliding motor 34 in response to set values of rotating speed and torque of the rolling motor 23 and the sliding motor 34.

The control unit 600 may control an operation of the reciprocating driving part 41. Furthermore, the control unit 600 may control an operation of the holding driving part 507.

The display 700 visually indicates an operational state of the rolling apparatus 100 and a controlled state of the control unit 600.

Hereinbelow, according to the embodiment of the present disclosure, operations of the rolling apparatus 100 and the evaluation system for evaluating the durability of the flexible material F will be described.

The rolling apparatus 100 is held at a regular location on the work plate unit 300 according to the specifications of the flexible material F. Then, the flexible material F is wound around the winding shaft 22 and the end of the flexible material F is held by the slider 32. Herein, as the rolling lever 26 is operated to rotate the winding shaft 22, the flexible material F maintains the flatness to be tight between the slider 32 and the winding shaft 22.

Next, the control unit 600 presets a rotating speed and torque of the rolling motor 23 and the sliding motor 34 according to the specifications of the flexible material F by the control unit 600, and operates the rolling apparatus 100.

Herein, the control unit 600 monitors a tension of the flexible material F measured by the load cell unit 50.

Herein, when the flexible material F is in poor condition, while the rotating speed of the torque of the rolling motor 23 are changed on the basis of the sliding motor 34 or the rotating speed and the torque of the sliding motor 34 are changed on the basis of the rolling motor 23, the condition of the flexible material F installed to the rolling apparatus 100 is repeatedly monitored to test the performance of the flexible material F and to evaluate the durability of the flexible material F.

As described above, according to the rolling apparatus 100 and the evaluation system for evaluating durability of a flexible material F of the present disclosure, the flexible material F can continuously maintain the even state thereof, and it is possible to adjust a tension of the flexible material F so that the tension applied to the flexible material F can evenly maintain.

Furthermore, as the rolling unit 20 and the sliding unit 30 are coupled to each other at the base unit 10, an initial setting of the flexible material F is clarified, an individual sliding operation of the sliding unit 30 and an individual rotating operation of the rolling unit 20 are operated clearly in conjunction with each other, and unlike the conventional evaluation apparatus, the rolling unit 20 is prevented from being moved and the flexible material F from wrinkling.

Furthermore, by the relation between a rotating speed of the sliding motor 34 and a rotating speed of the rolling motor 23, the flexible material F can maintain a tightly stretched state thereof, and a rolling operation and an unrolling operation of the flexible material F can be stably realized.

Furthermore, by the relation between a torque of the sliding motor 34 and a torque of the rolling motor 23, the flexible material F can maintain a tightly stretched state thereof, and a rolling operation and an unrolling operation of the flexible material F can be stably realized.

Furthermore, as the load cell unit 50 is additionally provided, a tension of the flexible material F is monitored in real time with respect to a rolling operation and an unrolling operation of the flexible material F, and the tension of the flexible material F can be measured or calculated.

Furthermore, by the detailed structure of the rolling unit 20, the winding shaft 22 can be rotatably held on the base unit 10.

Furthermore, as the rolling unit 20 includes the first gripping shaft 24 and the second gripping shaft 25, it is possible to prevent the winding shaft 22 from being moved.

Furthermore, as the rolling unit 20 includes the rolling lever 26, the winding shaft 22 can be rotated in manual, and the initial tension of the flexible material F can be adjusted.

Furthermore, as the rolling unit 20 includes the rolling check part 27, the number of rotation of the winding shaft 22 can be measured, and the amount of winding of the flexible material F around the winding shaft 22 can be calculated.

Furthermore, as the rolling unit 20 includes the brake 28, a stopped state of the winding shaft 22 at a predetermined location can be maintained.

Furthermore, as the rolling unit 20 includes the reciprocatively attaching and detaching part 29, the winding shaft 22 and the rolling motor 23 are removably coupled to each other, and the winding shaft 22 is separable from the rolling motor 23 so that replacement and maintenance of the rolling apparatus 100 can be simplified according to the specifications of the flexible material F.

Furthermore, as the reciprocating unit 40 is provided, the lock setting of the brake 28 can be easily released, and safety accidents due to an operation of the rolling unit 20 and an operation of the reciprocating unit 40 can be prevented.

Furthermore, by the detailed structure of the sliding unit 30, the slider 32 can be slidably moved at the base unit 10, and linear movement of the slider 32 is stabilized by a rotating force of the sliding motor 34 so that linear reciprocating movement of the flexible material F can be clarified.

Furthermore, as the sliding unit 30 includes the connecting bracket 33, the connecting bracket 33 and the sliding changing part 35 are removably coupled to each other and the connecting bracket 33 and the slider 32 are separable from the sliding changing part 35, so that the replacement and the maintenance of the rolling apparatus 100 can be simplified according to the specifications of the flexible material F.

Furthermore, as the sliding unit 30 includes the slider 32, relatively sliding movement between the slider 32 and the flexible material F can be realized to correspond to linear movement of the flexible material F, and it is possible to prevent the flexible material F from being deformed or broken.

Furthermore, by the detailed structure of the sliding changing part 35 in the sliding unit 30, a rotating movement of the sliding motor 34 is converted into a linear reciprocating movement of the slider 32 so that the sliding movement of the slider 32 can be efficiently performed.

Furthermore, as the sliding unit 30 includes the changing part cover 36, the sliding changing part 35 can be protected and the change-movable member 355 of the sliding changing part 35 can have a clear sliding path.

Furthermore, by the additional structure of the load cell unit 50 and the coupling relation between the load cell unit 50 and the slider 32, a tension applied to the flexible material F in response to sliding of the slider 32 can be easily calculated, and the first movable member 321 and the second movable member 323 that are separated from each other can be slidably coupled to each other.

Furthermore, by the additional structure of the work plate unit 300, the base unit 10 of the rolling apparatus 100 can be recovered to an original location, and it is possible to prevent the base unit 10 from being moved to correspond to an operation of the rolling apparatus 100.

Furthermore, by the additional structure of the module supporting unit 400, the rolling motor 23, the sliding motor 34, and the reciprocating unit 40 of the rolling apparatus 100 can be held on regular locations thereof, and power transmission system can be clarified.

Furthermore, by the additional structure of the apparatus holding unit 500, the base unit can be attached to and detached from the work plate unit 300, so that the replacement and the maintenance of the rolling apparatus 100 can be simplified according to the specifications of the flexible material F.

Furthermore, by the additional structure of the reciprocating unit 40, attachment and detachment between the work plate unit 300 and the base unit 10 can be easily performed, and attachment and detachment between the shafts of the rolling unit 20 and the sliding unit 30 can be efficiently performed.

Furthermore, as the additional structure of the control unit 600, an operation of the rolling apparatus 100 is classified, and various signals in response to the operation of the rolling apparatus 100 can be transmitted to the outside space in a wired or wireless method and used for big data.

Furthermore, by the additional structure of the display 700, a status value in response to an operation of the rolling apparatus can be indicated, and an operational state of the rolling apparatus 100 can be monitored.

Although the preferred embodiment of the present disclosure has been described with reference to the accompanying drawings, those skilled in the art will variously modify or change the present disclosure without departing from the scope and spirit of the present disclosure as disclosed in the accompanying claims

INDUSTRIAL APPLICABILITY

The present disclosure can realize a rolling apparatus and an evaluation system that are configured to continuously maintain a flat state of a flexible material when the flexible material is rolled and to adjust a tension of the flexible material so as to evenly maintain the tension applied to the flexible material.

What is claimed is:
1. A rolling apparatus for evaluating durability of a flexible material, the rolling apparatus comprising:
a base unit;
a rolling unit rotatably coupled to the base unit such that the flexible material is wound on a winding shaft provided in the rolling unit; and
a sliding unit which grips an end of the flexible material wound around the rolling unit and is spaced apart from the rolling unit to be slidably coupled to the base unit,
wherein a speed of the sliding unit is set to a predetermined value in a direction in which the flexible material is pulled,
wherein a speed of the rolling unit for an unrolling operation and a rolling operation of the rolling unit is controlled such that the flexible material maintains a flat state, and
wherein a sliding motor for sliding movement of the sliding unit has a rotating speed greater than a rotating speed of a rolling motor for rotation of the rolling unit,
wherein the sliding unit comprises a slider, a sliding changing part configured to linearly move the slider along a longitudinal direction of the base unit, and a connecting bracket provided at the slider to face toward the sliding changing part and detachably coupled to the sliding changing part,
wherein the rolling unit comprises a reciprocating unit and a shaft coupler, which is detachably coupled to the winding shaft, and
wherein the reciprocating unit moves along a lateral direction of the base unit, which is perpendicular to the longitudinal direction, and configured to push the base unit in the lateral direction so as to decouple the connecting bracket from the sliding changing part and to assist releasing of the winding shaft from the shaft coupler.

2. The rolling apparatus of claim 1, further comprising:
a load cell unit provided at the sliding unit, and configured to measure a tension applied to the flexible material in response to sliding movement of the sliding unit.

3. The rolling apparatus of claim 1, wherein the rolling unit comprises:
a pair of rolling brackets provided at the base unit while being spaced apart from each other in a width direction of the base unit,
wherein the winding shaft is rotatably coupled to the pair of rolling brackets such that the flexible material is wound between the pair of rolling brackets, and
wherein the rolling motor is configured to generate a rotating force to rotate the winding shaft.

4. The rolling apparatus of claim 3, wherein the winding shaft is coupled to the rolling motor via the shaft coupler.

5. The rolling apparatus of claim 1, wherein the sliding unit comprises:
a sliding rail formed in a long shape in the longitudinal direction of the base unit,
wherein the slider is slidably coupled to the sliding rail,
wherein the sliding motor is configured to generate a rotating force, and
wherein the sliding changing part is configured to move the slider by the rotating force of the sliding motor.

6. An evaluation system for evaluating durability of a flexible material, the evaluation system comprising:
the rolling apparatus of claim 1;
a work plate unit coupled to the base unit; and
a module supporting unit provided at the work plate unit, and configured to support a rolling motor provided at a rolling unit and a sliding motor provided at a sliding unit.

7. The evaluation system of claim 6, further comprising:
an apparatus holding unit configured to removably hold the base unit at the work plate unit.

8. A rolling apparatus for evaluating durability of a flexible material, the rolling apparatus comprising:
a base unit;
a rolling unit rotatably coupled to the base unit such that the flexible material is wound on a winding shaft provided in the rolling unit; and
a sliding unit which grips an end of the flexible material wound around the rolling unit and is spaced apart from the rolling unit to be slidably coupled to the base unit,
wherein a torque of the sliding unit is set to a predetermined value in a direction in which the flexible material is pulled,
wherein a torque of the rolling unit for an unrolling operation and a rolling operation of the rolling unit is controlled such that the flexible material maintains a flat state,
wherein a sliding motor for sliding movement of the sliding unit has a torque smaller than a torque of a rolling motor for rotation of the rolling unit,
wherein the sliding unit comprises a slider, a sliding changing part configured to linearly move the slider along a longitudinal direction of the base unit, and a connecting bracket provided at the slider to face toward the sliding changing part and detachably coupled to the sliding changing part,
wherein the rolling unit comprises a reciprocating unit and a shaft coupler, which is detachably coupled to the winding shaft, and
wherein the reciprocating unit moves along a lateral direction of the base unit, which is perpendicular to the longitudinal direction, and configured to push the base unit in the lateral direction so as to decouple the connecting bracket from the sliding changing part and to assist releasing of the winding shaft from the shaft coupler.

9. The rolling apparatus of claim 8, further comprising:
a load cell unit provided at the sliding unit, and configured to measure a tension applied to the flexible material in response to sliding movement of the sliding unit.

10. The rolling apparatus of claim 8, wherein the rolling unit comprises:
a pair of rolling brackets provided at the base unit while being spaced apart from each other in a width direction of the base unit,
wherein the winding shaft is rotatably coupled to the pair of rolling brackets such that the flexible material is wound between the pair of rolling brackets, and
wherein the rolling motor is configured to generate a rotating force to rotate the winding shaft.

11. The rolling apparatus of claim 10, wherein the winding shaft is coupled to the rolling motor via the shaft coupler.

12. The rolling apparatus of claim 8, wherein the sliding unit comprises:
a sliding rail formed in a long shape in the longitudinal direction of the base unit,
wherein the slider is slidably coupled to the sliding rail,
wherein the sliding motor is configured to generate a rotating force, and
wherein the sliding changing part is configured to move the slider by the rotating force of the sliding motor.

13. An evaluation system for evaluating durability of a flexible material, the evaluation system comprising:
the rolling apparatus of claim 8;
a work plate unit coupled to the base unit; and
a module supporting unit provided at the work plate unit, and configured to support a rolling motor provided at a rolling unit and a sliding motor provided at a sliding unit.

14. The evaluation system of claim 13, further comprising:
an apparatus holding unit configured to removably hold the base unit at the work plate unit.

* * * * *